(12) United States Patent
Han et al.

(10) Patent No.: US 11,359,585 B2
(45) Date of Patent: *Jun. 14, 2022

(54) ENGINE SYSTEM

(71) Applicants: Hyundai Motor Company, Seoul (KR); Kia Corporation, Seoul (KR)

(72) Inventors: Dong Hee Han, Seoul (KR); Jong Il Park, Seoul (KR); Hyun Jun Lim, Incheon (KR); Seungwoo Hong, Seoul (KR); Joowon Lee, Gwangju-si (KR); Kwanhee Choi, Seoul (KR); Heechang Oh, Suwon-si (KR); Yeongseop Park, Seoul (KR); Dong Ho Chu, Ansan-si (KR); Hyungbok Lee, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,186

(22) Filed: Nov. 23, 2020

(65) Prior Publication Data

US 2021/0071624 A1    Mar. 11, 2021

Related U.S. Application Data

(62) Division of application No. 15/832,593, filed on Dec. 5, 2017, now Pat. No. 10,883,453.

(30) Foreign Application Priority Data

Oct. 27, 2017    (KR) .................. 10-2017-0141045

(51) Int. Cl.
*F02M 26/46*    (2016.01)
*F02M 26/42*    (2016.01)
(Continued)

(52) U.S. Cl.
CPC .............. *F02M 26/42* (2016.02); *F01N 3/10* (2013.01); *F01N 3/101* (2013.01); *F01N 13/107* (2013.01);
(Continued)

(58) Field of Classification Search
CPC .. F02M 26/42; F02M 26/08; F02M 35/10157; F02M 356/108; F02M 35/112;
(Continued)

(56) References Cited

U.S. PATENT DOCUMENTS 4,249,374 A    2/1981    Sugasawa
4,296,724 A    10/1981    Lizuka
(Continued)

FOREIGN PATENT DOCUMENTS

CN    102192050 A    9/2011
CN    102207046 A    10/2011
(Continued)

*Primary Examiner* — Shafiq Mian
(74) *Attorney, Agent, or Firm* — Morgan, Lewis & Bockius LLP

(57) ABSTRACT

An engine system may include: an engine including cylinders that generate a driving torque by combusting fuel; a first intake manifold connected to an intake line through which flows intake air into some of the plurality of cylinders; a second intake manifold supplying the intake air to the other cylinders of the plurality of cylinders through the first intake manifold; a first exhaust manifold connected to some cylinders that are connected to the first intake manifold; a second exhaust manifold connected to some other cylinders that are connected to the second intake manifold; a recirculation line branched from the second exhaust manifold to be coupled to the second intake manifold; a recirculation inlet valve disposed at a point at which the recirculation line and the second exhaust manifold are joined; and a manifold (Continued)

connection valve disposed on an intake line between the first intake manifold and the second intake manifold.

6 Claims, 6 Drawing Sheets

(51) Int. Cl.
    *F01N 3/10*       (2006.01)
    *F02M 26/08*      (2016.01)
    *F01N 13/10*      (2010.01)
    *F02B 37/04*      (2006.01)
    *F02M 35/10*      (2006.01)
    *F02M 35/108*     (2006.01)
    *F02M 35/112*     (2006.01)

(52) U.S. Cl.
    CPC .............. *F02B 37/04* (2013.01); *F02M 26/08* (2016.02); *F02M 35/108* (2013.01); *F02M 35/10157* (2013.01); *F02M 35/112* (2013.01)

(58) Field of Classification Search
    CPC ........ F02B 37/04; F02B 37/162; F02B 39/10; F01N 3/10; F01N 3/101
    USPC ......................................... 60/605.2, 608, 611
    See application file for complete search history.

(56) References Cited

U.S. PATENT DOCUMENTS

| | | | |
|---|---|---|---|
| 4,304,208 A | 12/1981 | Etoh | |
| 4,313,406 A | 2/1982 | Lizuka | |
| 4,316,438 A | 2/1982 | Lizuka | |
| 4,344,393 A | 8/1982 | Etoh | |
| 4,345,571 A | 8/1982 | Lizuka | |
| 4,354,471 A | 10/1982 | Sugasawa | |
| 4,462,351 A | 7/1984 | Fujii | |
| 4,484,548 A | 11/1984 | Sugasawa | |
| 6,382,193 B1 | 5/2002 | Boyer | |
| 8,857,156 B2 | 10/2014 | Primus | |
| 8,931,462 B2 * | 1/2015 | Pappenheimer | .... F02D 41/0082 |
| | | | 123/568.11 |
| 9,435,298 B2 | 9/2016 | Hayman | |
| 2011/0000459 A1 | 1/2011 | Elsaer | |
| 2016/0237928 A1 | 8/2016 | Lana | |
| 2016/0298557 A1 | 10/2016 | Bjurman | |
| 2017/0159525 A1 | 6/2017 | Backhaus | |
| 2017/0159580 A1 | 6/2017 | Han | |
| 2017/0260916 A1 | 9/2017 | Kraemer | |
| 2017/0350325 A1 | 12/2017 | Han | |
| 2018/0051642 A1 | 2/2018 | Park | |
| 2018/0058289 A1 | 3/2018 | Lee | |
| 2018/0112633 A1 * | 4/2018 | Keating | ................ F02D 35/023 |
| 2018/0347487 A1 | 12/2018 | Stief | |
| 2019/0309693 A1 | 10/2019 | Forsberg | |
| 2019/0316548 A1 | 10/2019 | Wolk | |
| 2020/0300200 A1 | 9/2020 | Hong | |

FOREIGN PATENT DOCUMENTS

| | | |
|---|---|---|
| DE | 102004035323 A1 | 2/2006 |
| EP | 1619368 A1 | 1/2006 |
| FR | 2980823 A1 | 4/2013 |
| GB | 2304379 A | 3/1997 |
| JP | 03-222832 A | 10/1991 |
| JP | 2005054771 A | 3/2005 |
| JP | 2006250002 A | 9/2006 |
| JP | 2010-163945 A | 7/2010 |
| JP | 2013-164055 A | 8/2013 |
| KR | 10-1734250 B1 | 5/2017 |

* cited by examiner

ENGINE SYSTEM

CROSS-REFERENCE TO RELATED APPLICATION

The present application is a Divisional of U.S. patent application Ser. No. 15/832,593, filed Dec. 5, 2017, which claims priority to Korean Patent Application No. 10-2017-0141045 filed on Oct. 27, 2017, the entire contents of which are incorporated herein for all purposes by these references.

BACKGROUND OF THE INVENTION

Field of the Invention

The present invention relates to an engine system, and more particularly, to an engine system configured for implementing a cylinder deactivation effect without using a separate cylinder deactivation apparatus.

Description of Related Art

Generally, an internal combustion engine generates power by supplying fuel and air to a cylinder and combusting the fuel and air in the cylinder. When air is drawn in, an intake valve is operated by driving of a camshaft, and air is drawn in into the cylinder while the intake valve is open. Furthermore, the exhaust valve is operated by the driving of the camshaft, and the air is exhausted from the cylinder while the exhaust valve is open.

By the way, an optimal operation of the intake valve/exhaust valve is changed in a response to revolutions per minute (RPM) of an engine. That is, an appropriate lift or valve opening/closing time is changed in a response to the RPM of the engine. As described above, to implement an appropriate valve operation in a response to the RPM of the engine, a variable valve lift (VVL) apparatus for designing a shape of a cam driving the valve in plural or operating a valve at different lifts in a response to the RPM of the engine has been researched.

A cylinder de-activation (hereinafter, CDA) apparatus similar to the VVL apparatus in concept generally refers to a technology of deactivating some of all the cylinders during braking or a cruise control. During the CDA operation, a supply of fuel to cylinders to be deactivated and an operation of intake/exhaust valves are stopped.

When some cylinders are deactivated by the CDA apparatus, a pumping loss of the cylinders to be deactivated should be minimized and a loss of air supplied to catalyst to maintain an efficiency of the catalyst should be minimized.

For the present purpose, the related art has used a method for minimizing a pumping loss and an air flow into a catalyst by use of a mechanical configuration that stops a driving of an intake valve and an exhaust valve.

According to the CDA apparatus of the related art, the mechanical configuration for stopping the driving of the intake valve and the exhaust valve are additionally required, and as a result, main components of an engine, such as a cylinder head, needs to be changed.

Since an additional actuator for controlling the intake/exhaust valves for each cylinder is required, the number of components may be increased and manufacturing cost of a vehicle may be increased.

Furthermore, due to the increase in the number of components, the failure possibility of each component is increased and it is difficult to diagnose the failure of each part.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine system having advantages of implementing a CDA function without a separate mechanical configuration.

Various aspects of the present invention are directed to providing an engine system, including: an engine including a plurality of cylinders that generate a driving torque by combusting fuel; a first intake manifold connected to an intake line through which flows intake air into some of the plurality of cylinders; a second intake manifold supplying the intake air to the other cylinders of the plurality of cylinders through the first intake manifold; a first exhaust manifold connected to some cylinders that are connected to the first intake manifold; a second exhaust manifold connected to some other cylinders that are connected to the second intake manifold; a recirculation line branched from the second exhaust manifold to be coupled to the second intake manifold; a recirculation inlet valve disposed at a point at which the recirculation line and the second exhaust manifold are joined; and a manifold connection valve disposed on an intake line between the first intake manifold and the second intake manifold.

When the engine is operated normally, the recirculation inlet valve may be cut off to supply exhaust gas from the first and second exhaust manifolds to the exhaust gas cleaning device, and the manifold connection valve may be open to supply intake air to the second intake manifold through the first intake manifold.

When some cylinders are deactivated, the recirculation inlet valve may be open to supply the exhaust gas from the second exhaust manifold to the second intake manifold, and the manifold connection valve may be cut off not to supply the intake air to the second intake manifold through the first intake manifold.

The engine may be a four-cylindered engine including four cylinders of a first cylinder, a second cylinder, a third cylinder, and a fourth cylinder that are sequentially disposed, the first intake manifold may be connected to the first cylinder and the fourth cylinder, the second intake manifold may be connected to the second cylinder and the third cylinder, the first exhaust manifold may be connected to the first cylinder and the fourth cylinder, and the second exhaust manifold may be connected to the second cylinder and the third cylinder.

Various aspects of the present invention are directed to providing an engine system, including: an engine including a plurality of cylinders that generate a driving torque by combusting fuel; a first intake manifold connected to an intake line through which flows intake air into some of the plurality of cylinders; a second intake manifold supplying the intake air to the other cylinders of the plurality of cylinders through the first intake manifold; a first exhaust manifold connected to some cylinders that are connected to the first intake manifold; a second exhaust manifold connected to some other cylinders that are connected to the second intake manifold; a recirculation line branched from the second exhaust manifold to be coupled to the second intake manifold; a recirculation inlet valve disposed at a point at which the recirculation line and the exhaust manifold are joined; a manifold connection valve disposed on an intake line between the first intake manifold and the second intake manifold, and a turbocharger including a turbine which is disposed on the second exhaust line and rotates by exhaust gas and a compressor which is disposed on an intake line at an upstream of the first intake manifold and rotates by interlocking to the turbine.

The engine system may further include: an electric supercharger including a motor and an electric compressor operated by the motor to supply charge air to the cylinders.

The intake line may be provided with a bypass line that bypasses some of air supplied to the electric supercharger, and the bypass line may be provided with a bypass valve apparatus.

The engine may be a four-cylindered engine including four cylinders of a first cylinder, a second cylinder, a third cylinder, and a fourth cylinder that are sequentially disposed, the first intake manifold may be connected to the first cylinder and the fourth cylinder, the second intake manifold may be connected to the second cylinder and the third cylinder, the first exhaust manifold may be connected to the first cylinder and the fourth cylinder, and the second exhaust manifold may be connected to the second cylinder and the third cylinder.

When the engine is operated normally, the recirculation inlet valve may be cut off to supply exhaust gas from the first and second exhaust manifolds to the exhaust gas cleaning device, and the manifold connection valve may be open to supply intake air to the second intake manifold through the first intake manifold.

When some cylinders are deactivated, the recirculation inlet valve may be open to supply the exhaust gas from the second exhaust manifold to the second intake manifold, and the manifold connection valve may be cut off not to supply the intake air to the second intake manifold through the first intake manifold.

Various aspects of the present invention are directed to providing an engine system, including: an engine including a first cylinder bank and a second cylinder bank that include a plurality of cylinders generating a driving torque by combusting fuel; a first intake manifold distributing intake air into a cylinder of the first cylinder bank; a second intake manifold distributing the intake air into a cylinder of the second cylinder bank; a first exhaust manifold collecting exhaust gas from the cylinder of the first cylinder bank and supplying the collected exhaust gas to a first exhaust line; a second exhaust manifold collecting exhaust gas from the cylinder of the second cylinder bank and supplying the collected exhaust gas to a second exhaust line; a first throttle valve controlling an intake amount supplied to cylinders of the first cylinder bank through the first intake manifold; a second throttle valve controlling an intake amount supplied to cylinders of the second cylinder bank through the second intake manifold; a recirculation line branched from the second exhaust manifold to be coupled to the second intake manifold; and a recirculation valve disposed at a point at which the recirculation line and the second exhaust manifold are joined.

When the engine is operated normally, opening of a first throttle valve and a second throttle valve may be controlled to supply intake air to cylinders of a first cylinder bank and a second cylinder bank through a first intake manifold and a second intake manifold, and the recirculation valve may be cut off to supply exhaust gas from the second exhaust manifolds to the exhaust gas cleaning device.

When cylinders of some cylinder banks in the engine are deactivated, the recirculation valve may be open to supply the exhaust gas from the second exhaust manifold to the second intake manifold, and the second throttle valve may be cut off not to supply the intake air to cylinders of a second cylinder bank through the second intake manifold.

According to the engine system according to various exemplary embodiments of the present invention, it is possible to reduce the number of components and save the manufacturing cost of the vehicle, by implementing the CDA function without the separate mechanical configuration.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
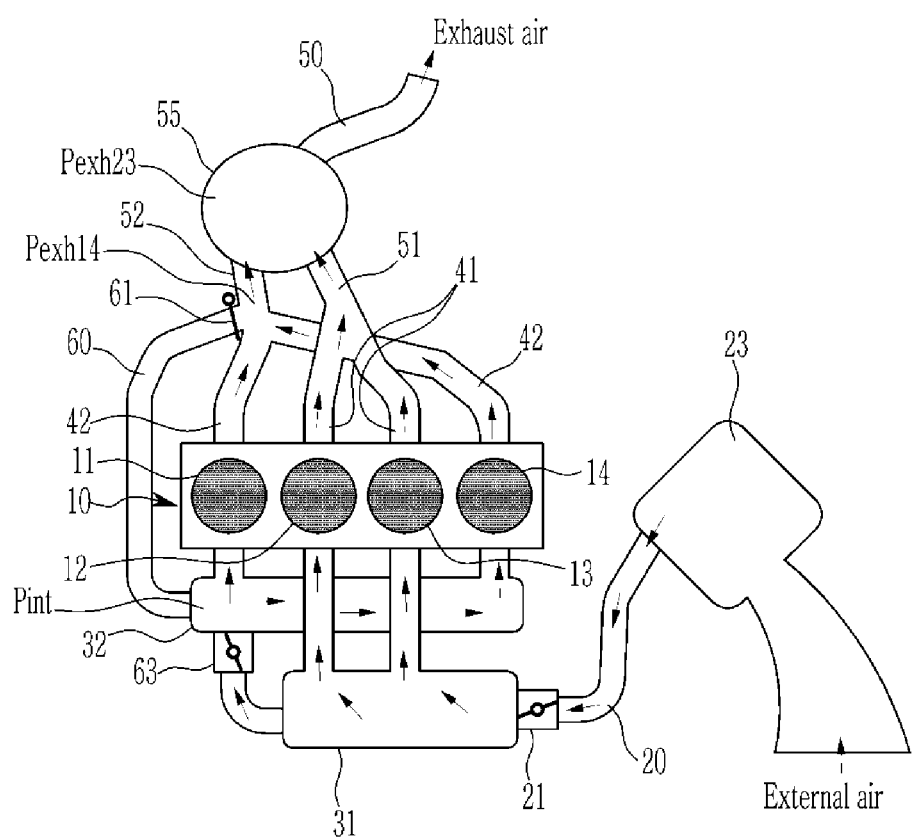
FIG. 1 and FIG. 2 are concept diagrams illustrating a configuration of an engine system according to various exemplary embodiments of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive. Like reference numerals designate like elements throughout the specification.

Since sizes and thicknesses of the respective components were arbitrarily shown in the accompanying drawings for convenience of explanation, the present invention is not limited to contents shown in the accompanying drawings. Furthermore, thicknesses were exaggerated to obviously represent several portions and regions.

Hereinafter, an engine system according to various exemplary embodiments of the present invention will be described more specifically with reference to the accompanying drawings.

As illustrated in FIG. 1, an engine system according to various exemplary embodiments of the present invention includes an engine 10 that includes a plurality of cylinders 11, 12, 13, and 14 generating a driving torque by combusting fuel, a plurality of intake manifolds that distributes intake air into the cylinders 11, 12, 13, and 14, and a plurality of exhaust manifolds that collect exhaust gas from the cylinders 11, 12, 13, and 14 and exhaust the collected exhaust gas to the exhaust line.

The cylinders 11, 12, 13, and 14 of the engine 10 may be a four-cylindered engine including four cylinders. That is, the plurality of cylinders may include a first cylinder 11, a second cylinder 12, a third cylinder 13, and a fourth cylinder 14 that are sequentially disposed.

However, for convenience of explanation, the four-cylindered engine will be described only by way of example and the scope of the present invention is not limited thereto. That is, the engine system according to the exemplary embodiment of the present invention may be applied to a six-cylindered engine, an eight-cylinder engine, or the like.

The plurality of intake manifolds may include a first intake manifold 31 and a second intake manifold 32. The first intake manifold 31 is connected to an intake line 20 in which external air flows to supply the external air to some of the plurality of cylinders 11, 12, 13, and 14. The second intake manifold 32 supplies external air to the other cylinders of the plurality of cylinders 11, 12, 13, and 14 through the first intake manifold 31.

For example, in the 4-cylindered engine, the first intake manifold 31 supplies intake air to the second cylinder 12 and the third cylinder 13 and the second intake manifold 32 supplies intake air to the first cylinder 11 and the fourth cylinder 14.

An inlet of the first intake manifold 31 which is connected to the intake line 20 is provided with a throttle valve 21 that controls an intake flow rate, and the intake line 20 is provided with an air cleaner that cleans external air.

The plurality of exhaust manifolds may include a first exhaust manifold 41 and a second exhaust manifold 42. The first exhaust manifold 41 is connected to some cylinders that are connected to the first intake manifold 31. The second exhaust manifold 42 is connected to the other cylinders that are connected to the second intake manifold 32.

For example, in the four-cylindered engine, the first exhaust manifold 41 collects exhaust gas from the first cylinder 11 and the fourth cylinder 14 and exhausts the collected exhaust gas to the exhaust line, and the second exhaust manifold 42 collects exhaust gas from the second cylinder 12 and the third cylinder 13 and exhaust the collected exhaust gas to the exhaust line.

The engine system according to the various exemplary embodiments of the present invention includes a recirculation line 60 which is branched from the second exhaust manifold 42 to be coupled to the second intake manifold 32.

A point at which the recirculation line 60 and the second exhaust manifold 42 are joined is provided with a recirculation inlet valve 61, and provided with a manifold connection valve 63 which is disposed in the intake line 20 between the first intake manifold 31 and the second intake manifold 32.

The first exhaust line 51 connected to the first exhaust manifold 41 and the second exhaust line 52 connected to the second exhaust manifold 42 are coupled to the main exhaust line 50. The main exhaust line 50 is provided with an exhaust gas cleaning device 55 that cleans various noxious materials included in the exhaust gas.

The exhaust gas cleaning device 55 may include a lean NOx trap (LNT) that cleans nitrogen oxide (NOx), a diesel oxidation catalyst, and a diesel particulate filter. Alternatively, the exhaust gas cleaning device 55 may include a three-way catalyst that cleans nitrogen oxide. The three-way catalyst is a catalyst that simultaneously triggers a reaction of carbon monoxide, nitrogen oxide, and hydrocarbon compounds as noxious components of the exhaust gas to remove the carbon monoxide, the nitrogen oxide, and the hydrocarbon compounds, and mainly, Pd alone may be used and a Pt/Rh, Pd/Rh or Pt/Pd/Rh-based three-way catalyst may be used.

Hereinafter, an operation of the engine system according to the various exemplary embodiments of the present invention as described above will be described.

Referring to FIG. 1, when the engine 10 is operated normally, the recirculation inlet valve 61 is cut off, and the manifold connection valve 63 is open.

Accordingly, external air flowing from the intake line 20 into the first intake manifold 31 is supplied to the second cylinder 12 and the third cylinder 13. The external air flowing into the second intake manifold 32 through the first intake manifold 31 is supplied to the first cylinder 11 and the fourth cylinder 14.

During the combustion, the exhaust gas from the second cylinder 12 and the third cylinder 13 is collected in the first exhaust manifold 41 and expelled to the outside through the first exhaust line 51 and the main exhaust line 50. The exhaust gas from the first cylinder 11 and the fourth cylinder 14 is collected in the second exhaust manifold 42 and expelled to the outside through the second exhaust line 52 and the main exhaust line 50.

Figure 2:
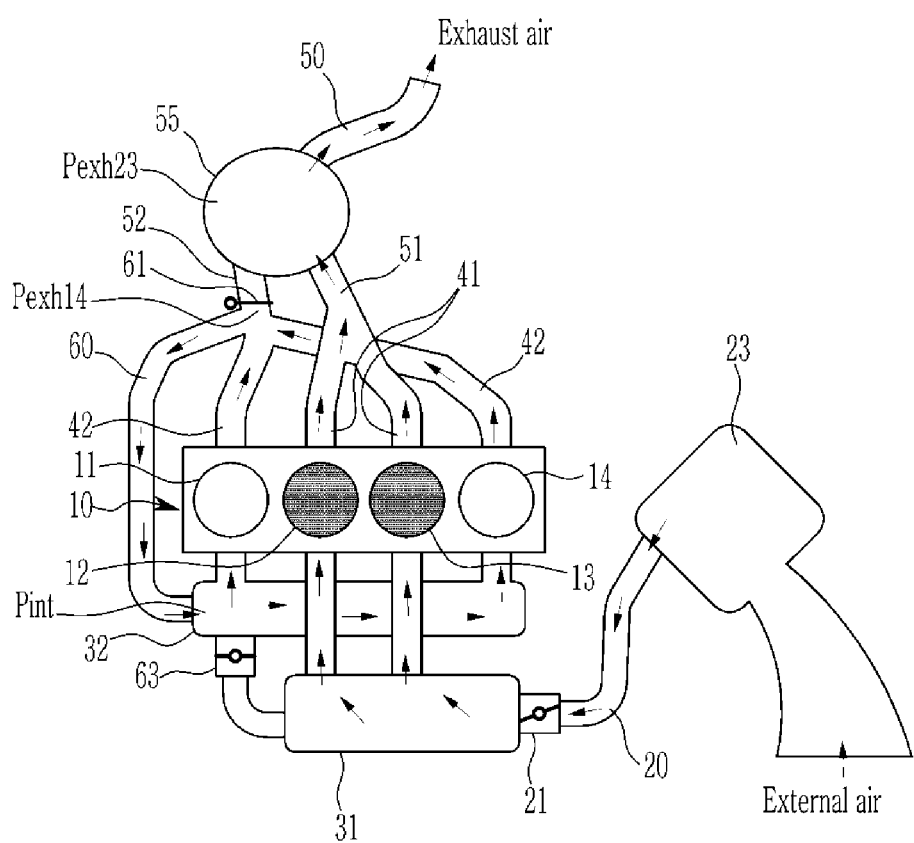

Referring to FIG. 2, when some cylinders of the engine 10 needs to be deactivated like low speed driving or coasting of a vehicle, the recirculation inlet valve 61 is open and the manifold connection valve 63 is cut off. Fuel is not injected into the cylinders (e.g., first cylinder and fourth cylinder) to be deactivated.

Accordingly, the external air flowing from the intake line 20 into the first intake manifold 31 is supplied to the activated cylinders (e.g., second cylinder and the third cylinder). The exhaust gas from the activated cylinder is collected in the first exhaust manifold 41 and is expelled to the outside through the first exhaust line 51 and the main exhaust line 50.

However, since the manifold connection valve 63 is cut off, the external air does not flow in the second intake manifold 32 through the first intake manifold 31 and is not supplied to the cylinders (e.g., first cylinder and fourth cylinder) to be deactivated.

Furthermore, since the manifold connection valve 63 is cut off and the recirculation inlet valve 61 is open, the second intake manifold 32 and the second exhaust manifold 42 fluidically-communicate with each other, and the whole exhaust flow rate exhausted from the deactivated cylinders (e.g., first cylinder and fourth cylinder) again flows into the deactivated cylinders.

In the present way, since the intake system including the second intake manifold 32 and the exhaust system including the second exhaust manifold 42 fluidically-communicate with each other, an intake pressure Pint and an exhaust pressure Pexh14 of the first cylinder 11 and the fourth cylinder 14 to be deactivated almost coincide with each other. Accordingly, a pumping loss of the first cylinder 11 and the fourth cylinder 14 to be deactivated is minimized.

Furthermore, since an exhaust pressure Pexh23 of the activated second cylinder 12 and third cylinder 13 is greater than that of the deactivated first cylinder 11 and fourth cylinder 14 and the recirculation inlet valve 61 is open so that relatively low-temperature exhaust gas from the deactivated first cylinder 11 and fourth cylinder 14 is not expelled to the exhaust gas cleaning device 55, it is possible to prevent a temperature of the catalyst of the exhaust gas cleaning device 55 from falling below an activation temperature and prevent an efficiency of the catalyst from deteriorating accordingly.

Hereinafter, an engine system according to various exemplary embodiments of the present invention will be described more specifically with reference to the accompanying drawings.

Figure 3:
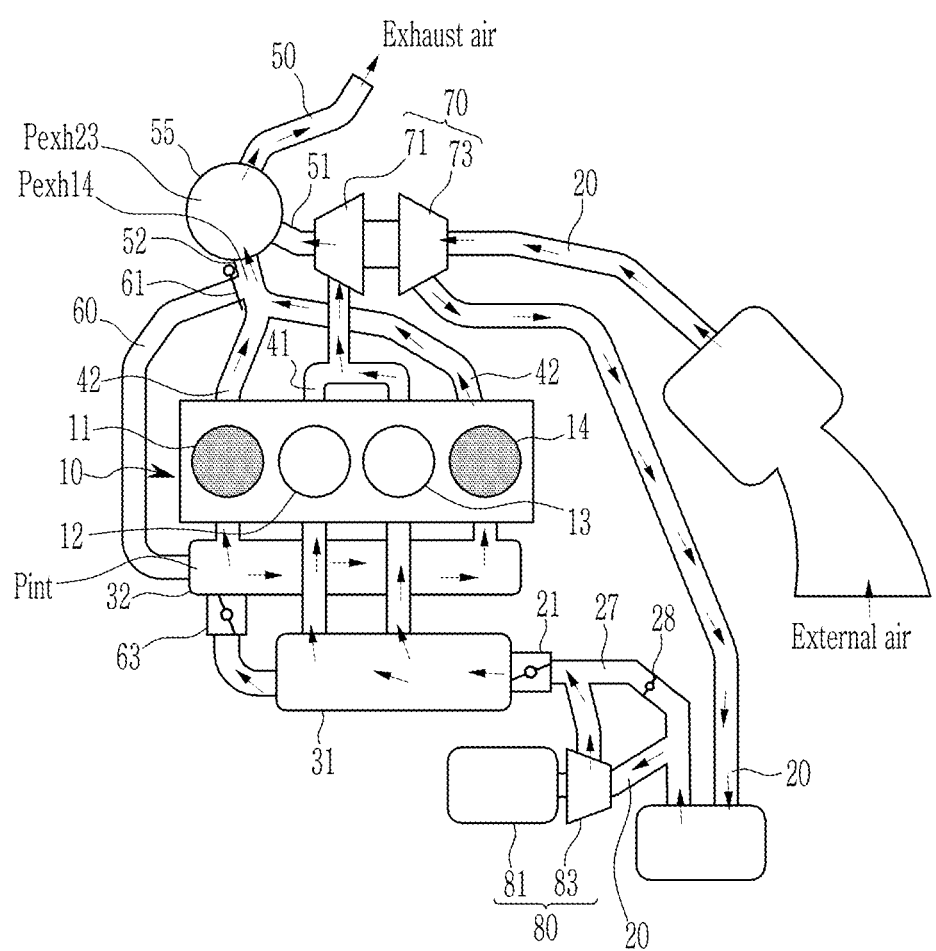
FIG. 3 and FIG. 4 are concept diagrams illustrating a configuration of an engine system according to various exemplary embodiments of the present invention.
Figure 4:
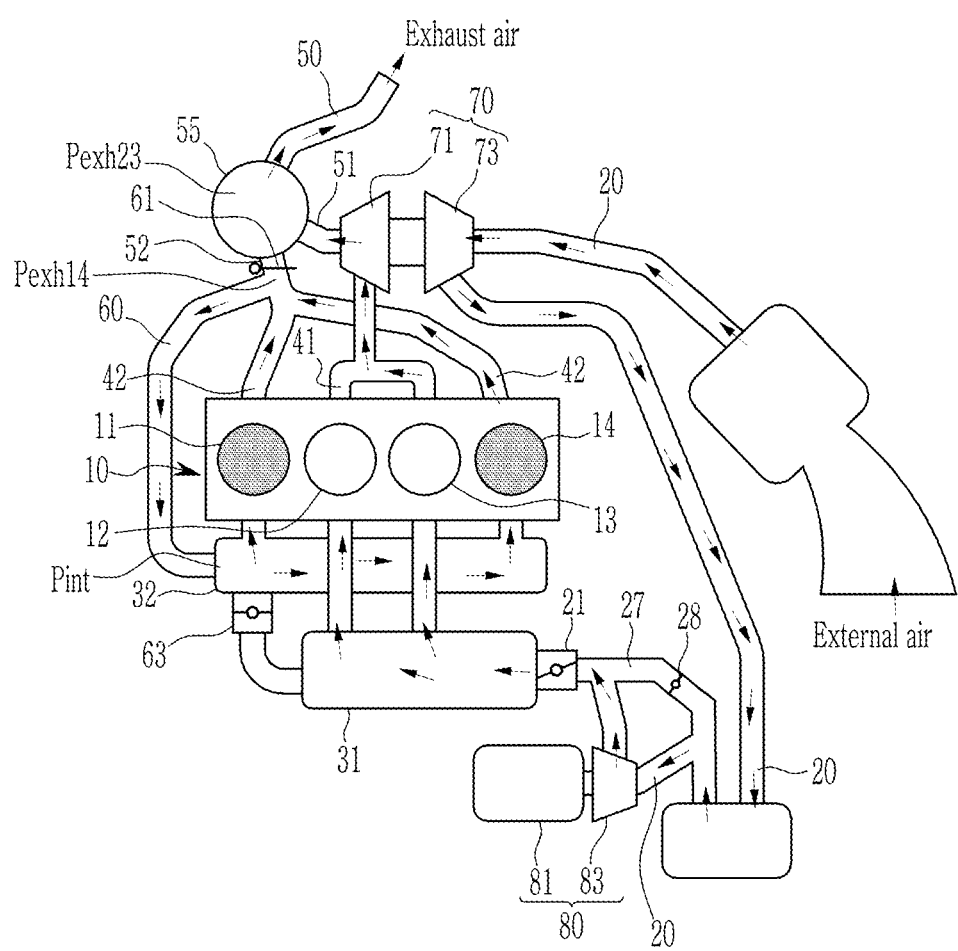

FIG. 3 and FIG. 4 are concept diagrams illustrating a configuration of an engine system according to various exemplary embodiments of the present invention.

A basic configuration of the engine system according to the various exemplary embodiments of the present invention illustrated in FIG. 3 and FIG. 4 is fundamentally the same as the engine system as described above. However, the engine system according to the various exemplary embodiments of the present invention is different from the engine system according to the various exemplary embodiments of the present invention in that it further includes a turbocharger 70 and an electric supercharger 80 that supply charge air to the cylinders 11, 12, 13, and 14 of the engine. Hereinafter, for convenience of explanation, the same components will be omitted, and only different components will be described.

The engine system according to the various exemplary embodiments of the present invention may further include the turbocharger 70 and the electric supercharger 80 that supply charge air to the cylinder of the engine 10.

The turbocharger 70 includes a turbine 71 which is disposed in the first exhaust line 51 to rotate by exhaust gas and a compressor 73 which is disposed on the intake line 20 at an upstream of the first intake manifold 31 and rotates by interlocking to the turbine 71.

The electric supercharger 80 is disposed in the intake line 20 in which the external air flows and includes a motor 81 and an electric compressor 83 which is operated by the motor 81.

The intake line 20 is disposed on a bypass line 27 that bypasses some air supplied to the electric supercharger 80, and the bypass line 27 is provided with a bypass valve apparatus 28. An intake amount bypassing the electric supercharger 80 is controlled by an opening of the bypass valve apparatus 28.

As described above, the engine system according to the various exemplary embodiments of the present invention may supply the charge air to the cylinders 11, 12, 13, and 14 of the engine 10 through the turbocharger 70 and the electric supercharger 80, expanding an operating area of the engine 10.

The operation of the engine system according to the various exemplary embodiments of the present invention is the same as that of the various exemplary embodiments as described above, and therefore a detailed description thereof will be omitted.

Hereinafter, an engine system according to various exemplary embodiments of the present invention will be described more specifically with reference to the accompanying drawings.

Figure 5:
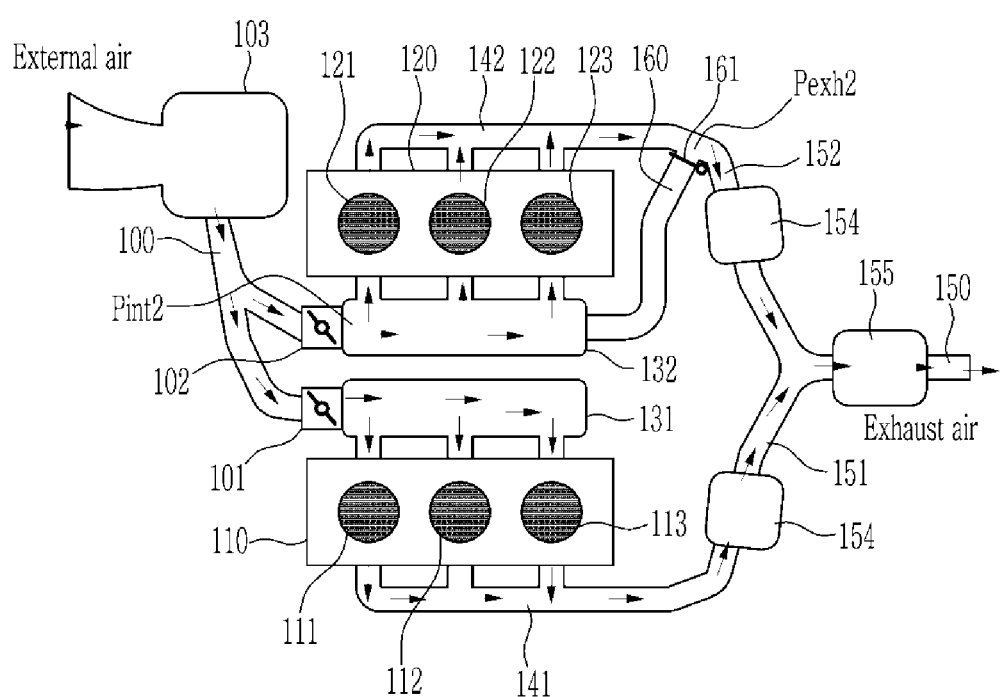
FIG. 5 and FIG. 6 are concept diagrams illustrating a configuration of an engine system according to various exemplary embodiments of the present invention.
Figure 6:
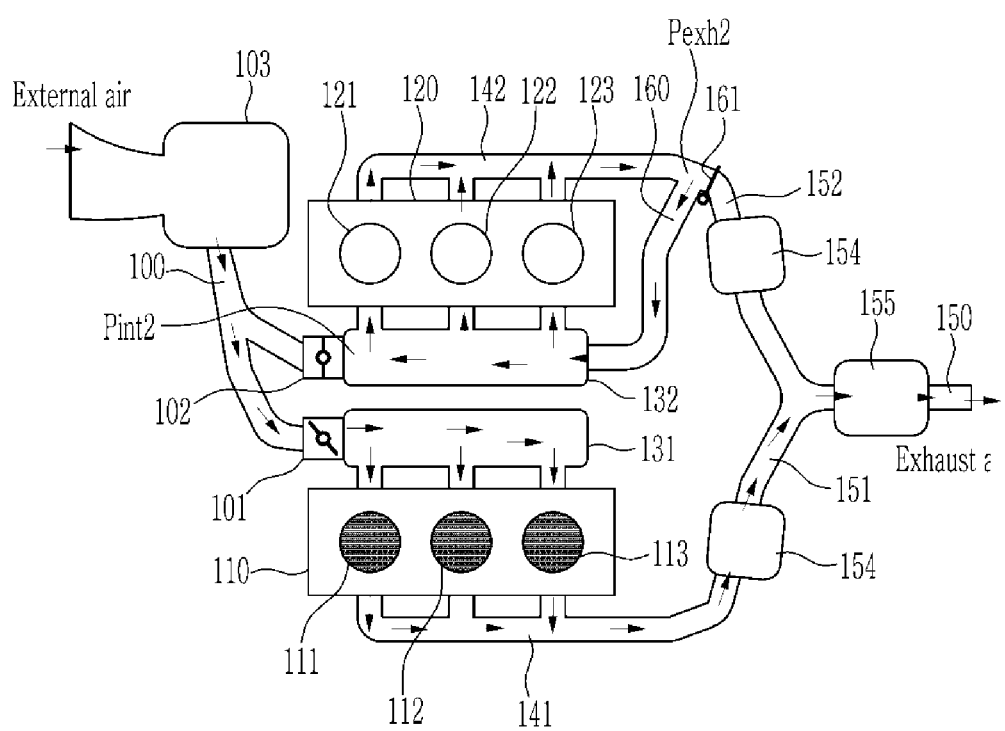

FIG. 5 and FIG. 6 are concept diagrams illustrating a configuration of an engine system according to various exemplary embodiments of the present invention.

As illustrated in FIG. 5 and FIG. 6, the engine system according to the various exemplary embodiments of the present invention includes an engine that includes a plurality of cylinders generating a driving torque by combusting fuel, a plurality of intake manifolds that distributes intake air into the cylinders, and a plurality of exhaust manifolds that collect exhaust gas from the cylinders and exhausts the collected exhaust gas to an exhaust line.

The engine is divided into a first cylinder bank 110 and a second cylinder bank 120, and the respective cylinder banks include a plurality of cylinders. The respective cylinder banks may be a six-cylindered engine including three cylinders. However, the scope of the present invention is not limited thereto, and therefore the cylinder bank may also be implemented as an eight-cylindered engine or a twelve-cylindered engine.

The plurality of intake manifolds may include a first intake manifold 131 and a second intake manifold 132. The first intake manifold 131 is connected to an intake line 100 in which external air flows to supply the external air to cylinders 111, 112, and 113 of the first cylinder bank 110. The second intake manifold 132 is connected to an intake line 100 in which external air flows to supply the external air to cylinders 121, 122, and 123 of the second cylinder bank 120.

Inlets of the first intake manifold 131 and the second intake manifold 132 connected to the intake line 100 are each provided with a first throttle valve 101 and a second throttle valve 102 that controls an intake flow rate. The intake line 100 is provided with an air cleaner 103 that cleans the external air.

The plurality of exhaust manifolds may include a first exhaust manifold 141 and second exhaust manifolds 142 and 42.

The first exhaust manifold 141 collects the exhaust gas from the cylinders 111, 112, and 113 of the first cylinder bank 110 and exhausts the collected exhaust gas to a first exhaust line 151, and the second exhaust manifold 142 and 42 collect the exhaust gas from the cylinders 121, 122, and 123 of the second cylinder bank 120 and exhaust the collected exhaust gas to a second exhaust line 152. The first exhaust line 151 and the second exhaust line 152 are coupled to a main exhaust line 150.

The first exhaust line 151, the second exhaust line 152, and the main exhaust line 150 are each provided with exhaust gas cleaning devices 154 and 155.

The first exhaust gas cleaning device 154 which is disposed in the first exhaust line 151 and the second exhaust line 152, respectively, may be a gasoline particulate filter (GPF) that filters particulate materials included in the exhaust gas.

The second exhaust gas cleaning device 155 disposed in the main exhaust line 150 may include a three-way catalyst that cleans nitrogen oxide. The three-way catalyst is a catalyst that simultaneously triggers a reaction of carbon monoxide, nitrogen oxide, and hydrocarbon compounds as noxious components of the exhaust gas to remove the carbon monoxide, the nitrogen oxide, and the hydrocarbon compounds, and mainly, Pd alone may be used and a Pt/Rh, Pd/Rh or Pt/Pd/Rh-based three-way catalyst may be used.

The engine system according to the various exemplary embodiments of the present invention includes a recirculation line 160 which is branched from the second exhaust manifold 142 to be coupled to the second intake manifold 132. A point at which the recirculation line 160 and the second exhaust manifold 142 are joined is provided with a recirculation valve 161.

Hereinafter, an operation of the engine system according to the various exemplary embodiments of the present invention as described above will be described more specifically.

Referring to FIG. 5, when the engine is operated normally, the openings of the first throttle valve 101 and the second throttle valve 102 are each controlled depending on an engine load, and the recirculation valve 161 is cut off.

Accordingly, the external air is supplied to the cylinders of the first cylinder bank 110 and the cylinders of the second cylinder bank 120, respectively, through the first intake manifold 131 and the second intake manifold 132.

The exhaust gas from the cylinders 111, 112, and 113 of the first cylinder bank 110 during the combustion is collected in the first exhaust manifold 141 and expelled to the outside through the first exhaust line 151 and the main exhaust line 150.

Since the recirculation valve 161 is cut off, the exhaust gas from the cylinders 121, 122, and 123 of the second cylinder bank 120 is collected in the second exhaust manifold 142 and expelled to the outside through the second exhaust line 152 and the main exhaust line 150.

Referring to FIG. 6, when some cylinders of the engine 10 needs to be deactivated like low speed driving or coasting of a vehicle, the recirculation valve 161 is open and the second throttle valve 102 is cut off. Fuel is not injected into the cylinders 121, 122, and 123 of the second cylinder bank 120 to be deactivated.

Accordingly, the external air flowing from the intake line 100 into the first intake manifold 131 is supplied to the activated cylinders 111, 112, and 113 of the first cylinder bank 110. The exhaust gas from the activated cylinders 111, 112, and 113 of the first cylinder bank 110 is collected in the first exhaust manifold 141 and expelled to the outside through the first exhaust line 151 and the main exhaust line 150.

However, since the second throttle valve 102 is cut off, the external air is not supplied to the cylinders 121, 122, and 123 of the second cylinder bank 120 through the second intake manifold 132.

Furthermore, since the recirculation valve 161 is open, the second intake manifold 132 and the second exhaust manifold 142 fluidically-communicate with each other, and the whole flow rate exhausted from the cylinders 121, 122, and 123 of the deactivated second cylinder bank 120 again flows into the cylinders 121, 122, and 123 of the re-deactivated second cylinder bank 120.

In the present way, since the intake system including the second intake manifold 132 and the exhaust system including the second exhaust manifold 142 fluidically-communicate with each other, an intake pressure Pint2 and an exhaust pressure Pexh2 of the deactivated second cylinder bank 120 almost coincide with each other.

Furthermore, since the recirculation valve 161 is open and thus the relatively low-temperature exhaust gas from the cylinder of the deactivated second cylinder bank 120 is not expelled to the exhaust gas cleaning device, it is possible to prevent the temperature of the catalyst of the exhaust gas cleaning device from falling below the activation temperature and prevent the efficiency of the catalyst from deteriorating accordingly.

That is, the recirculation valve 161 according to the various exemplary embodiments of the present invention performs the same function as the recirculation inlet valve 61 according to the various exemplary embodiments, and the second throttle valve 102 according to the various exemplary embodiments performs the same function as the manifold connection valve 63 according to the various exemplary embodiments.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine system, comprising:
an engine including a plurality of cylinders that generate a driving torque by combusting fuel;
a first intake manifold connected to an intake line through which flows intake air into some of the plurality of cylinders;
a second intake manifold connected to the first intake manifold in series and supplying the intake air to other cylinders of the plurality of cylinders through the first intake manifold;
a first exhaust manifold connected to some cylinders that are connected to the first intake manifold;
a second exhaust manifold connected to some other cylinders that are connected to the second intake manifold;
a recirculation line branched from the second exhaust manifold to be coupled to the second intake manifold;
a recirculation inlet valve disposed at a point at which the recirculation line and the second exhaust manifold are joined;
a manifold connection valve disposed on an intake line between the first intake manifold and the second intake manifold, and
a turbocharger including a turbine which is disposed on the first exhaust line and rotates by exhaust gas and a compressor which is disposed on the intake line at an upstream of the first intake manifold and rotates by interlocking to the turbine.

2. The engine system of claim 1, further including:
an electric supercharger including a motor and an electric compressor operated by the motor to supply charge air to the cylinders.

3. The engine system of claim 2, wherein
the intake line is provided with a bypass line that bypasses some of air supplied to the electric supercharger, and the bypass line is provided with a bypass valve.

4. The engine system of claim 1, wherein
the engine is a four-cylindered engine including four cylinders of a first cylinder, a second cylinder, a third cylinder, and a fourth cylinder that are sequentially disposed,
the first intake manifold is connected to the second cylinder and the third cylinder,
the second intake manifold is connected to the first cylinder and the fourth cylinder,
the first exhaust manifold is connected to the second cylinder and the third cylinder, and
the second exhaust manifold is connected to the first cylinder and the fourth cylinder.

5. The engine system of claim 1, wherein
when the engine is operated normally,
the recirculation inlet valve is cut off to supply exhaust gas from the second exhaust manifold to an exhaust gas cleaning device, and
the manifold connection valve is open to supply intake air to the second intake manifold through the first intake manifold.

6. The engine system of claim 1, wherein
when some cylinders are deactivated,
the recirculation inlet valve is open to supply the exhaust gas from the second exhaust manifold to the second intake manifold, and
the manifold connection valve is cut off not to supply the intake air to the second intake manifold through the first intake manifold.

\* \* \* \* \*